(12) United States Patent
Sugimura et al.

(10) Patent No.: US 11,254,264 B2
(45) Date of Patent: Feb. 22, 2022

(54) SENSOR ASSEMBLING STRUCTURE FOR ROTARY MOUNTING-TYPE WINDSHIELD MOUNTED INNER MIRROR FOR VEHICLE

(71) Applicants: MURAKAMI CORPORATION, Shizuoka (JP); HONDA MOTOR CO., LTD., Tokyo (JP)

(72) Inventors: Naomi Sugimura, Shimada (JP); Tatsuya Ohmaru, Wako (JP); Manami Inai, Utsunomiya (JP)

(73) Assignees: MURAKAMI CORPORATION, Shizuoka (JP); HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 16/965,166

(22) PCT Filed: Jan. 29, 2019

(86) PCT No.: PCT/JP2019/002975
§ 371 (c)(1),
(2) Date: Jul. 27, 2020

(87) PCT Pub. No.: WO2019/151253
PCT Pub. Date: Aug. 8, 2019

(65) Prior Publication Data
US 2020/0361380 A1 Nov. 19, 2020

(30) Foreign Application Priority Data
Jan. 31, 2018 (JP) .............................. JP2018-014789

(51) Int. Cl.
*B60R 1/04* (2006.01)
*B60R 1/12* (2006.01)

(52) U.S. Cl.
CPC .................. *B60R 1/04* (2013.01); *B60R 1/12* (2013.01); *B60R 2001/1215* (2013.01); *B60R 2001/1223* (2013.01); *B60R 2001/1261* (2013.01)

(58) Field of Classification Search
CPC ...... B60R 1/04; B60R 1/12; B60R 2001/1223
(Continued)

(56) References Cited

U.S. PATENT DOCUMENTS 6,087,953 A * 7/2000 DeLine .................. B60K 35/00
340/815.4
6,250,148 B1 * 6/2001 Lynam ..................... B60R 1/04
73/170.17
(Continued)

FOREIGN PATENT DOCUMENTS

DE    10256835 A1 *  6/2004  .............. B60R 1/04
EP     1040962 A2    10/2000
(Continued)

OTHER PUBLICATIONS

U.S. Appl. No. 29/657,909 to Naomi Sugimura, filed Jul. 26, 2018.
(Continued)

*Primary Examiner* — Ricky D Shafer
(74) *Attorney, Agent, or Firm* — Greenblum & Bernstein, P.L.C.

(57) ABSTRACT

A sensor assembling structure includes a sensor assembling void formed in a mounting base, a sensor assembling leaf spring, and mounting base-side leaf spring mounting portions formed at the mounting base. The mounting base is mounted to a windshield. The sensor assembling void receives a sensor. The sensor assembling leaf spring includes mounting base mounted portions. In a state in which the sensor is received in the sensor assembling void, the sensor assembling leaf spring is mounted to the mounting base-side
(Continued)

leaf spring mounting portions via the mounting base mounted portions. The sensor assembling leaf spring maintains a state in which the sensor is received in the sensor assembling void.

7 Claims, 10 Drawing Sheets

(58) Field of Classification Search
USPC .......................................................... 359/871
See application file for complete search history.

(56) References Cited

U.S. PATENT DOCUMENTS

| | | | |
|---|---|---|---|
| 6,299,319 B1 | 10/2001 | Mertens et al. | |
| 6,326,613 B1 | 12/2001 | Heslin et al. | |
| 6,447,127 B1 | 9/2002 | Yoshida et al. | |
| 7,726,623 B2* | 6/2010 | Muller | B60R 1/04 248/475.1 |
| 9,174,577 B2 | 11/2015 | Busscher et al. | |
| 2004/0164228 A1* | 8/2004 | Fogg | B60Q 1/1423 250/208.1 |
| 2004/0232773 A1* | 11/2004 | Parker | B60R 1/04 307/10.1 |
| 2012/0105990 A1 | 5/2012 | Quinn et al. | |
| 2012/0162430 A1* | 6/2012 | Heslin | B60R 11/02 348/148 |
| 2014/0055617 A1* | 2/2014 | Minikey, Jr. | F16F 1/32 348/148 |
| 2014/0063630 A1 | 3/2014 | Busscher et al. | |
| 2016/0016518 A1 | 1/2016 | Jeon et al. | |
| 2016/0023605 A1 | 1/2016 | Busscher et al. | |
| 2018/0297526 A1* | 10/2018 | Hennig | B60R 1/12 |
| 2020/0361379 A1* | 11/2020 | Sugimura | B60R 1/04 |

FOREIGN PATENT DOCUMENTS

| | | |
|---|---|---|
| JP | 2001-151019 A | 6/2001 |
| JP | 2016-22941 A | 2/2016 |

OTHER PUBLICATIONS

U.S. Appl. No. 29/657,901 to Naomi Sugimura, filed Jul. 26, 2018.
Written Opinion issued in Patent Application No. PCT/JP2019/002975, dated Mar. 12, 2019, along with an English translation thereof.
International Search Report issued in Patent Application No. PCT/JP2019/002975, dated Mar. 12, 2019, along with an English translation thereof.

* cited by examiner

SENSOR ASSEMBLING STRUCTURE FOR ROTARY MOUNTING-TYPE WINDSHIELD MOUNTED INNER MIRROR FOR VEHICLE

The disclosure of Japanese Patent Application No. JP2018-014789 filed on Jan. 31, 2018 including the specification, drawings, claims and abstract s incorporated herein by reference in its entirety.

TECHNICAL FIELD

This invention relates to a sensor assembling structure for a rotary mounting-type windshield mounted inner mirror for a vehicle, the sensor assembling structure being favorable in assembly accuracy and ease of assembly of a sensor.

BACKGROUND ART

As conventional windshield mounted inner mirrors for a vehicle with a sensor such as a rain sensor being assembled to the inner mirror, there are those described in Patent Literatures 1 to 3. In the below, the reference numerals in brackets denote reference numerals used in Patent Literatures 1 to 3. The inner mirror described in Patent Literature 1 has a structure in which in joining an end (12) of a support stay (10) to a mounting base fixed to a windshield (22), a sensor (26) is assembled to the inner mirror in such a manner that the sensor (26) is pressed against the windshield (22) by a biasing member (28) mounted to the support stay (10).

The inner mirror described in Patent Literature 2 has a structure in which a sensor (18) is assembled to the inner mirror by inserting the sensor (18) to a tunnel (34) of a bridge (32) of a mounting base (36) fixed to a windshield (12). The inner mirror described in Patent Literature 3 has a structure in which a sensor (8) is received in advance in an opening of a mounting base (20) fixed to a windshield (1) and in joining an end of a support stay (5) to the mounting base (20), the sensor (8) is assembled to the inner mirror in such a manner that the sensor (8) is pressed against the windshield (1) by a biasing member (10) disposed in a dent (7) of the support stay (5).

CITATION LIST

Patent Literature

Patent Literature 1: U.S. Pat. No. 6,326,613, specification
Patent Literature 2: U.S. Patent Application Publication No. 2012/0105990, specification
Patent Literature 3: EP Patent No. 1040962, specification

SUMMARY OF INVENTION

Technical Problem

The inner mirrors described in Patent Literatures 1 and 3 each have a structure in which in joining a support stay to a mounting base, a sensor is assembled to the inner mirror in such a manner that the sensor is pressed against a windshield by a biasing member held on the support stay. Therefore, in mounting the support stay to the mounting base, the sensor may be mounted in such a manner that the sensor is displaced from a correct position. Therefore, there is a problem in assembly accuracy. Also, vibration of the support stay is easily transmitted to the sensor via the biasing member, causing a problem in that a failure is likely to occur in the sensor.

The inner mirror described in Patent Literature 2 takes a lot of labor in inserting the sensor to the tunnel and thus is poor in ease of assembly.

This invention has solved the aforementioned problems in the conventional techniques and provides a sensor assembling structure for a rotary mounting-type windshield mounted inner mirror for a vehicle, the sensor assembling structure being favorable in assembly accuracy and ease of assembly of a sensor.

Solution to Problem

A sensor assembling structure according to this invention is an assembling structure for an inner mirror for a vehicle, the assembling structure assembling a sensor to an inner mirror for a vehicle, wherein: the inner mirror includes a mounting base to be mounted to a windshield surface of a cabin of a vehicle, a support stay to be mounted to the mounting base so as to be capable of dropping off from the mounting base, and a mirror body supported by the support stay; the inner mirror includes a structure in which a support stay mounting surface of the mounting base and a mounted surface of the support stay are made to face each other and the mounting base and the support stay are joined via a support stay mounting leaf spring so as to be capable of rotating relative to each other in a direction around a predetermined rotation axis crossing the surfaces facing each other; the support stay mounting surface and the mounted surface include respective abutment support structures that are formed in the direction around the rotation axis and abut against each other via a biasing force of the support stay mounting leaf spring; the inner mirror is configured in such a manner that when the support stay is rotated in the direction around the rotation axis against the biasing force of the support stay mounting leaf spring in a state in which the mounting base and the support stay are joined via the support stay mounting leaf spring, the support stay is mounted to the mounting base by increasing the biasing force of the support stay mounting leaf spring via the abutment support structures to bring the support stay mounting surface and the mounted surface into pressure-abutment with each other; the inner mirror is configured in such a manner that when an external force of a predetermined amount or more is applied to the support stay in a state in which the support stay is mounted to the mounting base, joining between the support stay and the mounting base is undone against the biasing force of the support stay mounting leaf spring by the external force to make the support stay drop off from the mounting base; the assembling structure includes a sensor assembling void formed in the mounting base, a sensor assembling leaf spring, and a mounting base-side leaf spring mounting portion formed at the mounting base; the sensor assembling void is configured to receive the sensor; the sensor assembling leaf spring includes a mounting base mounted portion; and the assembling structure is configured in such a manner that in a state in which the sensor is received in the sensor assembling void, the sensor assembling leaf spring is mounted to the mounting base-side leaf spring mounting portion via the mounting base mounted portion, thereby maintaining the sensor received in the sensor assembling void via the sensor assembling leaf spring. Accordingly, the sensor can be mounted to the mounting base not in conjunction with mounting of the support stay to the mounting base (that is, independently from mounting of the support stay to the mounting base), and thus, in mounting the support stay to the mounting base, displacement of the sensor from a correct position is curbed. As a result, favorable assembly accuracy of the sensor can be provided. Also, there is no need to insert the sensor to a tunnel, providing ease of assembly.

In this sensor assembling structure, it is possible that: the sensor assembling leaf spring includes a sensor pressing portion; and the assembling structure is configured in such a manner that in a state in which the mounting base is mounted to a windshield surface of a cabin of a vehicle, the sensor is received in the sensor assembling void and the sensor assembling leaf spring is mounted to the mounting base-side leaf spring mounting portion via the mounting base mounted portion, the sensor pressing portion presses the sensor to press the sensor against the windshield surface. Accordingly, the sensor can be mounted to the mounting base and pressed against the windshield surface not in conjunction with mounting of the support stay to the mounting base (that is, independently from mounting of the support stay to the mounting base).

In this sensor assembling structure, it is possible that in a state in which the support stay is mounted to the mounting base, the sensor is not in contact with the support stay. Accordingly, vibration of the support stay is less easily transmitted to the sensor, enabling a failure to be less likely to occur in the sensor.

In this sensor assembling structure, it is possible that: the assembling structure includes a sensor-side leaf spring mounting portion formed at the sensor; the sensor assembling leaf spring includes a sensor mounted portion; and the sensor assembling leaf spring is mounted to the sensor-side leaf spring mounting portion via the sensor mounted portion. Accordingly, the sensor assembling leaf spring can be mounted to the mounting base and the sensor can be mounted to the mounting base in a state in which the sensor assembling leaf spring is mounted to the sensor.

In this sensor assembling structure, it is possible that the mounting base-side leaf spring mounting portion of the mounting base and the mounting base mounted portion of the sensor assembling leaf spring are mounted to each other via pawl engagement, and the sensor-side leaf spring mounting portion of the sensor and the sensor mounted portion of the sensor assembling leaf spring are mounted to each other via pawl engagement. Accordingly, the mounting base and the sensor assembling leaf spring can easily be mounted to each other via pawl engagement and the sensor and the sensor assembling leaf spring can easily be mounted to each other via pawl engagement.

In this sensor assembling structure, it is possible that a gap is formed in part or entirety of an area between the support stay mounting surface and the mounted surface, except places at which the support stay mounting surface and the mounted surface abut against each other via the abutment support structures, in a state in which the support stay is mounted to the mounting base. Accordingly, a harness, a harness connector, etc., can be disposed in the gap between the support stay mounting surface and the mounted surface.

DESCRIPTION OF EMBODIMENT

Figure 1:
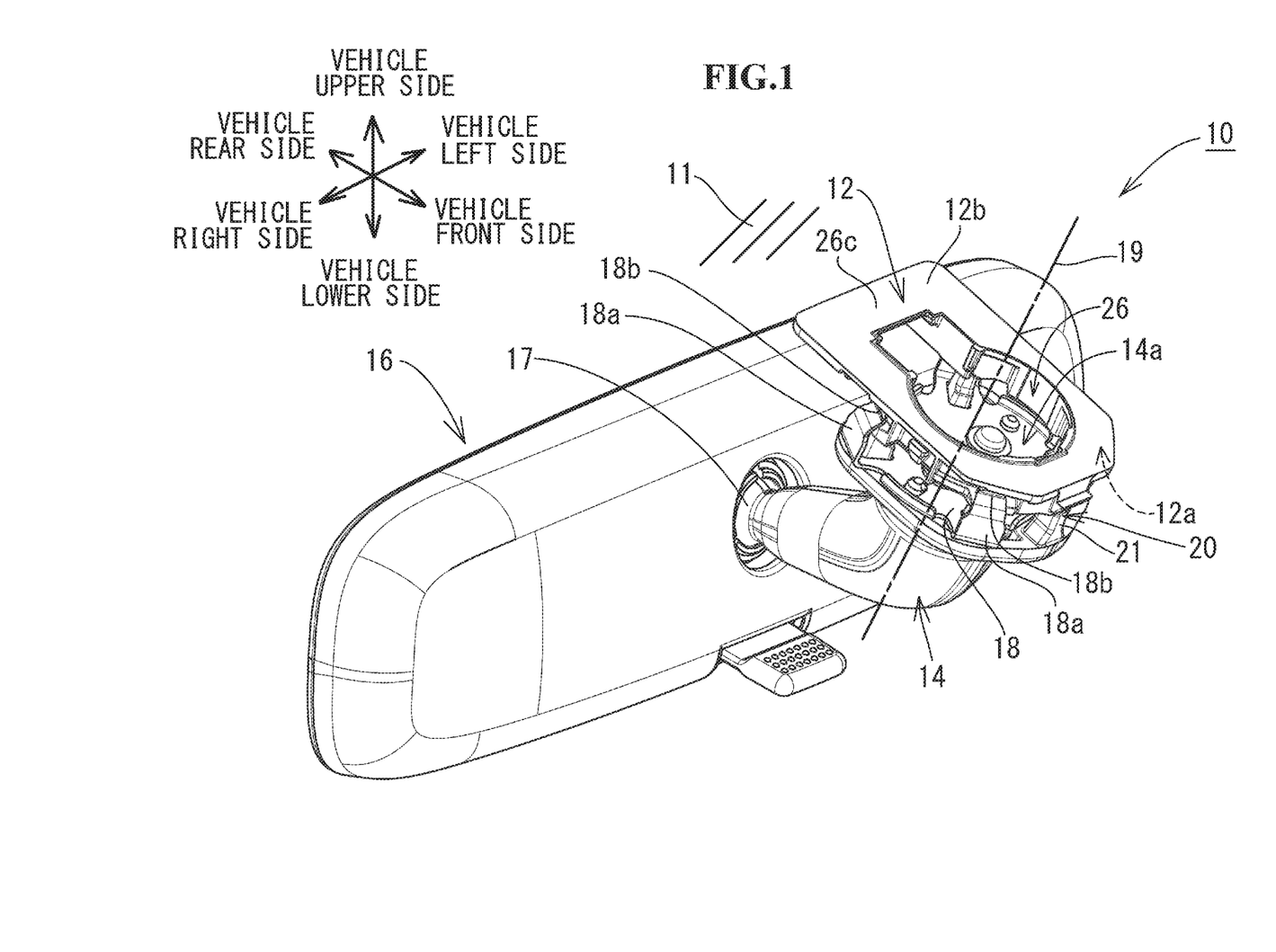
FIG. 1 is a diagram illustrating an embodiment of this invention and is a perspective diagram of an inner mirror for a vehicle as viewed from the upper side of the back side (vehicle front side). This figure illustrates the inner mirror mounted to a mounting base installed on a windshield, as viewed from the outside of the vehicle through the windshield. The illustration is provided with a sensor sub-assembly (hereinafter referred to as "sensor") and a cover and an auxiliary cover removed.

An embodiment of this invention will be described. FIG. 1 illustrates an embodiment of an inner mirror for a vehicle, to which this invention is applied. FIG. 1 illustrates an inner mirror 10 mounted to a mounting base 12 bonded to a windshield 11, as viewed from the outside of the vehicle through the windshield 11. The illustration is provided with a sensor and a cover removed. The mounting base 12 is mounted to the windshield 11 by bonding a bonding surface 12b to a surface on the cabin side of the windshield 11 of the vehicle. Therefore, the mounting base 12 is mounted to the windshield 11 in a position in which the bonding surface 12b is inclined so as to face the obliquely upper front side of the vehicle. A mirror body 16 is mounted to the mounting base 12 via a support stay 14. The mirror body 16 is formed of, e.g., a conventional mirror using a reflective mirror or an electronic mirror with an image display device such as a liquid-crystal display incorporated therein (which may be one with both an image display device and a reflective mirror provided therein). A support stay mounting leaf spring 18 is mounted to a proximal end (that is, an end on the side on which the mounting base 12 is mounted) of the support stay 14 via screw-fastening. The mirror body 16 is mounted to a terminal end (that is, an end on the side on which the mirror body 16 is mounted) of the support stay 14 in such a manner that a mirror angle can be adjusted via a pivot 17.

In a state in which the mounting base 12 is mounted to the windshield 11, the support stay 14 is mounted to the mounting base 12 according to the following procedure. Note that mounting of the mirror body 16 to the support stay 14 is performed before or after mounting of the support stay 14 to the mounting base 12. A support stay mounting surface 12a (that is, a surface to which the support stay 14 is to be mounted) of a mounting base 12 and a mounted surface 14a (that is, a surface which is to be mounted to the mounting base 12) of the support stay 14 are made to face each other. Consequently, four legs 18a of the support stay mounting leaf spring 18 protrudes in a direction toward the mounting base 12. The support stay 14 is made to approach the mounting base 12, and respective free ends of the four legs 18a of the support stay mounting leaf spring 18 are pressed into and thereby engaged with the mounting base 12. Consequently, the mounting base 12 and the support stay 14 are joined to each other via the support stay mounting leaf spring 18. The support stay 14 is rotated in a direction around a rotation axis 19. Here, the rotation axis 19 is an axis that extends through respective centers of the support stay mounting surface 12a and the mounted surface 14a facing each other and is perpendicular to the support stay mounting surface 12a and the mounted surface 14a. Respective abutment support structures 20 that extend in the direction around the rotation axis 19 and abut against each other and slide relative to each other are formed at the support stay mounting surface 12a and the mounted surface 14a. The support stay mounting surface 12a and the mounted surface 14a abut against each other at the abutment support structures 20 by means of a biasing force of the support stay mounting leaf spring 18. Upon the support stay 14 being rotated around the rotation axis 19 in a mounting direction (here, a clockwise direction as viewed from a worker for mounting work) against the biasing force of the legs 18a, a distance between the support stay mounting surface 12a and the mounted surface 14a are widened by the abutment support structures 20, and accordingly, the biasing force of the legs 18a increases. At the time of the support stay 14 being rotated by a predetermined amount, the rotation of the support stay 14 is stopped. Consequently, the support stay mounting surface 12a and the mounted surface 14a are pressed and abut against each other via the abutment support structures 20 by means of the biasing force of the support stay mounting leaf spring 18, and as a result, the support stay 14 is mounted to the mounting base 12. Upon application of a large external force of a predetermined amount or more to the mirror body 16 in the state in FIG. 1 in which the inner mirror 10 is mounted to the windshield 11, the external force is applied to the mounting base 12 via the support stay 14 and the engagement between the legs 18a and the mounting base 12 is undone against the biasing force of the legs 18a. As a result, the support stay 14 drops off from the mounting base 12. Note that as modes of action of the support stay 14 dropping off from the mounting base 12, there are "rotational drop-off" and "sliding drop-off" depending on the direction of the external force applied to the mirror body 16. Rotational drop-off is an action of the support stay 14 rotating with one arbitrary position in a circumferential direction of the support stay mounting surface 12a of the mounting base 12, as a point of support, and dropping off from the mounting base 12. In other words, the support stay 14 rotates in such a manner that a part, on the side opposite to the point of support, of the support stay 14 is removed from the mounting base 12 (that is, moved away from the windshield 11), and thereby dropping off from the mounting base 12. Sliding drop-off is an action of the support stay 14 sliding toward the obliquely lower side of the vehicle front side along an inclination of the support stay mounting surface 12a of the mounting base 12 (that is, along an inclination of the windshield 11) and thereby dropping off from the mounting base 12.

Figure 2:
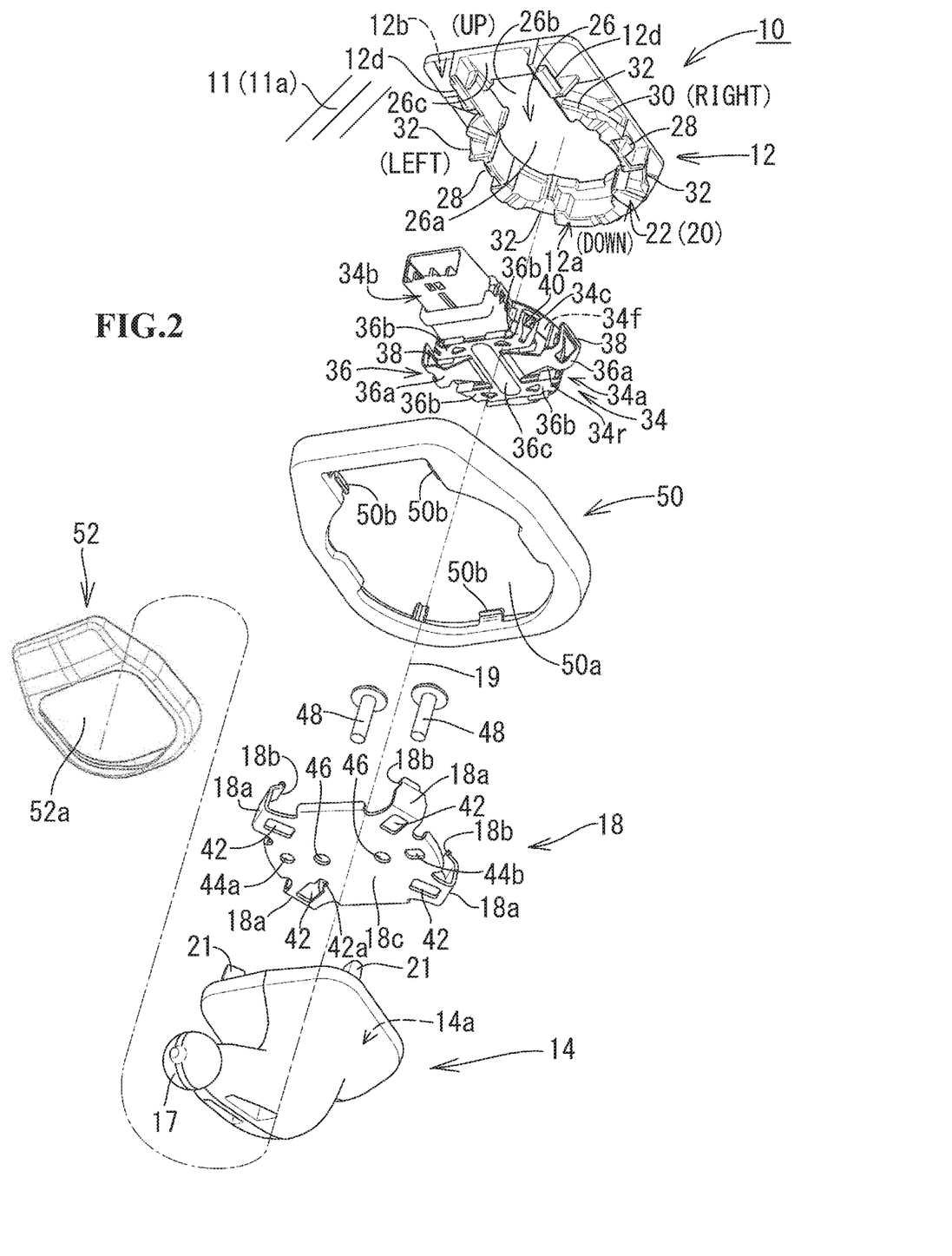
FIG. 2 is an exploded perspective view of the inner mirror in FIG. 1. Illustration of a mirror body is omitted. The sensor and a sensor assembling leaf spring are illustrated in a state in which the sensor and the leaf spring are assembled.

FIG. 2 illustrates the inner mirror 10 in FIG. 1 disassembled into respective components. Illustration of the mirror body 16 is omitted. Also, a sensor and a sensor assembling leaf spring are illustrated in a state in which the sensor and a sensor assembling leaf spring are assembled. The respective components will be described. In the below description, respective directions of "up (upper)", "down (lower)", "left" and "right" in the direction around the rotation axis 19 of each of the components are expressed with reference to the following position. In other words, the reference position is a position in which the rotation axis 19 is viewed in the axis direction from the support stay 14 side toward the mounting base 12 side when the inner mirror 10 is mounted to the windshield.

<<Mounting Base 12>>

The entire mounting base 12 is formed of a single piece of a material such as a glass fiber-reinforced resin or a steel. A sensor assembling void 26 is formed in a surface of the mounting base 12. The sensor assembling void 26 includes a sensor body receiving portion 26a and a connector receiving portion 26b. The sensor body receiving portion 26a is formed as a void having a round shape with the rotation axis 19 as a center. The sensor body receiving portion 26a is formed so as to extend through the front and the back of the mounting base 12. The connector receiving portion 26b is formed as a rectangular void that communicates with a part in the circumferential direction of the sensor body receiving portion 26a and extends in a radial direction with the rotation axis 19 as a center. Left and right walls on the front end side of the connector receiving portion 26b are joined to each other via a joining portion 26c. The mounting base 12 is mounted to a surface (windshield surface) 11a on the cabin side of the windshield 11 by bonding in a state in which the connector receiving portion 26b is disposed on the upper side. In the support stay mounting surface 12a, an undulating support surface 22 is formed adjacent to the sensor body receiving portion 26a on the outer circumferential side of the sensor body receiving portion 26a. The support surface 22 forms a mounting base 12-side structure of the abutment support structures 20. The support surface 22 is formed so as to extend in the circumferential direction with the rotation axis 19 as a center. Respective mounting base-side leaf spring mounting portions 28 are formed at positions on the left and right sides of an outer circumferential surface of the support stay mounting surface 12a. Here, the mounting base-side leaf spring mounting portions 28 are formed as engagement pawls for pawl engagement. In the outer circumferential surface of the support stay mounting surface 12a, a circumferential groove 30 is formed so as to extend in the circumferential direction at each of four positions that are upper left, upper right, lower left and lower right positions. A counterclockwise end in the circumferential direction of each circumferential groove 30 communicates with a relevant entrance 32 that opens to the support stay mounting surface 12a side. When the support stay 14 is to be mounted to the mounting base 12, the entrances 32 allow pawls 18b at the free ends of the legs 18a of the support stay mounting leaf spring 18 to move in a direction along the rotation axis 19 and enter the respective entrances 32. The circumferential grooves 30 engage with the pawls 18b that has entered the entrances 32 and allow the pawls 18b to move (slide) in the direction around the rotation axis 19 along the circumferential grooves 30 while locking the pawls 18b so as to prevent the pawls 18b from moving in the direction along the rotation axis 19.

<<Sensor 34 and Sensor Assembling Leaf Spring 36>>

The sensor 34 is formed, for example, as a sensor subassembly in which what is called a rain sensor or a rain-light sensor is disposed inside a resin case. The sensor 34 includes a sensor body 34a and a connector 34b. A sensor element, a substrate, etc., are housed in the sensor body 34a. A vehicle-side sensor harness (not illustrated) is connected to the connector 34b. In an outer circumferential surface of the sensor body 34a, a sensor-side leaf spring mounting portion 34c is formed at each of four positions, upper left, upper right, lower left and lower right positions, in the circumferential direction. Here, the sensor-side leaf spring mounting portions 34c are formed as engagement pawls for pawl engagement. A sensor assembling leaf spring 36 is formed of a single leaf spring of a metal material such as steel. A sensor pressing portion 36c facing a back surface (non-sensing surface) 34r of the sensor 34 is disposed at a center of the sensor assembling leaf spring 36. Two mounting base mounting legs 36a and four sensor mounting legs 36b are disposed radially from the sensor pressing portion 36c. The sensor assembling leaf spring 36 is configured in this way. Free ends of the six legs 36a, 36b are flexed in a direction toward the windshield 11 so as to surround the sensor 34. A mounting base mounted portion 38 is formed at each of the free ends of the mounting base mounting legs 36a. A sensor mounted portion 40 is formed at each of the free ends of the sensor mounting legs 36b. Here, the mounting base mounted portions 38 and the sensor mounted portions 40 are formed as pawl engagement holes for pawl engagement. The sensor assembling leaf spring 36 is mounted to the sensor 34 by the four sensor mounted portions 40 being brought into pawl engagement with the four sensor-side leaf spring mounting portions 34c, respectively. At this time, the sensor pressing portion 36c abuts on the back surface 34r of the sensor 34 with pressure by a biasing force of the sensor assembling leaf spring 36, and thus, the sensor assembling leaf spring 36 is mounted to the sensor 34 with no backlash. In a state in which the sensor assembling leaf spring 36 is mounted to the sensor 34, the sensor 34 is inserted to the sensor assembling void 26 of the mounting base 12, and the mounting base mounted portions 38 at two, left and right, positions in the sensor assembling leaf spring 36 is brought into pawl engagement with the mounting base-side leaf spring mounting portions 28 at two, left and right, positions in the mounting base 12. Consequently, the sensor 34 is mounted to the mounting base 12 via the sensor assembling leaf spring 36. In a state in which the mounting base 12 is mounted to the windshield, a front surface (sensing surface) 34f of the sensor 34 is pressed against the windshield surface 11a by the biasing force of the sensor assembling leaf spring 36. In this way, the sensor 34 is received in the sensor assembling void 26 and the sensing surface 34f is stably held in a state in which the sensing surface 34f is pressed against the windshield surface 11a.

<<Support Stay 14>>

The entire support stay 14 is formed of a single piece of a material such as a glass fiber-reinforced resin or a steel. Five protrusions 21 are formed in a protruding manner at the mounted surface 14a of the support stay 14 so as to surround the rotation axis 19. The protrusions 21 form a support stay 14-side structure of the abutment support structures 20. Heights of tops of the five protrusion 21 are equal to one another. In other words, the tops of the five protrusions 21 are disposed on a same plane perpendicular to the rotation axis 19.

<<Support Stay Mounting Leaf Spring 18>>

The support stay mounting leaf spring 18 is formed of one leaf spring of a metal material such as steel. A support stay mounting portion 18c to be placed and supported on the mounted surface 14a of the support stay 14 is disposed at a center of the support stay mounting leaf spring 18. The four legs 18a are disposed radially from the support stay mounting portion 18c. The support stay mounting leaf spring 18 is configured in this way. The legs 18a are flexed relative to the support stay mounting portion 18c in the direction toward the mounting base 12. The free ends of the leg 18a are flexed inward and thereby form the pawls 18b. The total four pawls 18b are disposed at respective positions that are the same in the radial direction (that is, on a same circle) relative to the rotation axis 19. Of circumferential edges 18d, 18e (see FIG. 5B) of an inner circumferential surface of each pawl 18b, a circumferential edge 18d on the front-end side in the rotary mounting direction is chamfered to form a C-surface. Consequently, when the support stay 14 is rotated in the mounting direction that is a direction around the rotation axis 19 in order to mount the support stay 14 on the mounting base 12, the mounting is facilitated by reduction in sliding resistance between the pawls 18b and the circumferential grooves 30. On the other hand, the circumferential edges 18e on the rear-end side in the rotary mounting direction are not chamfered. Consequently, the sliding resistance between the pawls 18b and the circumferential grooves 30 are made to be large in a return direction (removal direction) and the support stay 14 is thereby prevented from spontaneously rotating in the return direction because of, e.g., vibration of the vehicle. In FIG. 2, four protrusion insertion holes 42, two positioning holes 44a, 44b for positioning relative to the mounted surface 14a and two screw through holes 46 are provided in the support stay mounting portion 18c. The four protrusion insertion holes 42 allow four protrusions 21, on the left and right sides, of the five protrusions 21 to be inserted therethrough. The protrusion insertion holes 42 are formed at respective positions that are the same as those of the legs 18a in the circumferential direction and are on the inner circumferential side relative to the legs 18a, with reference to the rotation axis 19. An erroneous assembling preventing cutout 42a (see FIG. 4) is formed in one of the four protrusion insertion holes 42. Correspondingly, an erroneous assembling preventing rib 21b (see FIG. 4) to be made to enter the erroneous assembling preventing cutout 42a is formed at one of the four protrusions 21 on the left and right sides. The support stay mounting leaf spring 18 is assembled to the support stay 14 by adjusting a direction of the support stay mounting leaf spring 18 to a direction in which the erroneous assembling preventing rib 21b is inserted to the erroneous assembling preventing cutout 42a and inserting the four protrusions 21 to the four protrusion insertion holes 42. Consequently, the support stay mounting leaf spring 18 is prevented from being mounted to the support stay 14 in an erroneous direction (that is, reversely in the front-rear direction). The positioning hole 44a is a hole for a reference pin and the positioning hole 44b is a hole for a width-across-flats pin. The support stay mounting leaf spring 18 is mounted to the mounted surface 14a of the support stay 14 via two tapping screws 48. Upon the support stay mounting leaf spring 18 being mounted to the mounted surface 14a, the four protrusions 21 on the left and right sides of the five protrusions 21 are disposed at respective positions that are the same as those of the legs 18a in the circumferential direction and are on the inner circumferential side relative to the legs 18a.

<<Cover 50 and Auxiliary Cover 52>

Each of a cover 50 and an auxiliary cover 52 is formed of a resin. The cover 50 includes an opening 50a. The auxiliary cover 52 includes an opening 52a. The cover 50 is mounted to the mounting base 12 by means of pawl engagement. In the cover 50, a plurality of engagement pawls 50b for the pawl engagement are formed at respective positions at which the plurality of engagement pawls 50b face the opening 50a. On the other hand, pawl receiving portions 12d that engage with the respective engagement pawls 50b are formed in the mounting base 12. The cover 50 is mounted to the mounting base 12 by bringing the engagement pawls 50b into pawl engagement with the respective pawl receiving portions 12d. The auxiliary cover 52 is mounted to the cover 50 by means of pawl engagement. The cover 50 and the auxiliary cover 52 enable the mounting base 12 and the part of joining between the mounting base 12 and the support stay 14 to be hidden from the outside. Since the cover 50 and the auxiliary cover 52 are intended to hide the mounting base 12 and the part of joining between the mounting base 12 and the support stay 14 from the outside (that is, only need to hide these parts), the cover 50 and the auxiliary cover 52 can be configured to be small. Even if a large external force is applied to the support stay 14 and thereby drops off from the mounting base 12, the cover 50 is maintained in a state in which the cover 50 is mounted to the mounting base 12.

Steps for assembling the above-described components and mounting the inner mirror 10 to the windshield 11 will be described.

<<Step of Mounting the Sensor and the Cover to the Mounting Base>>

Figure 3:
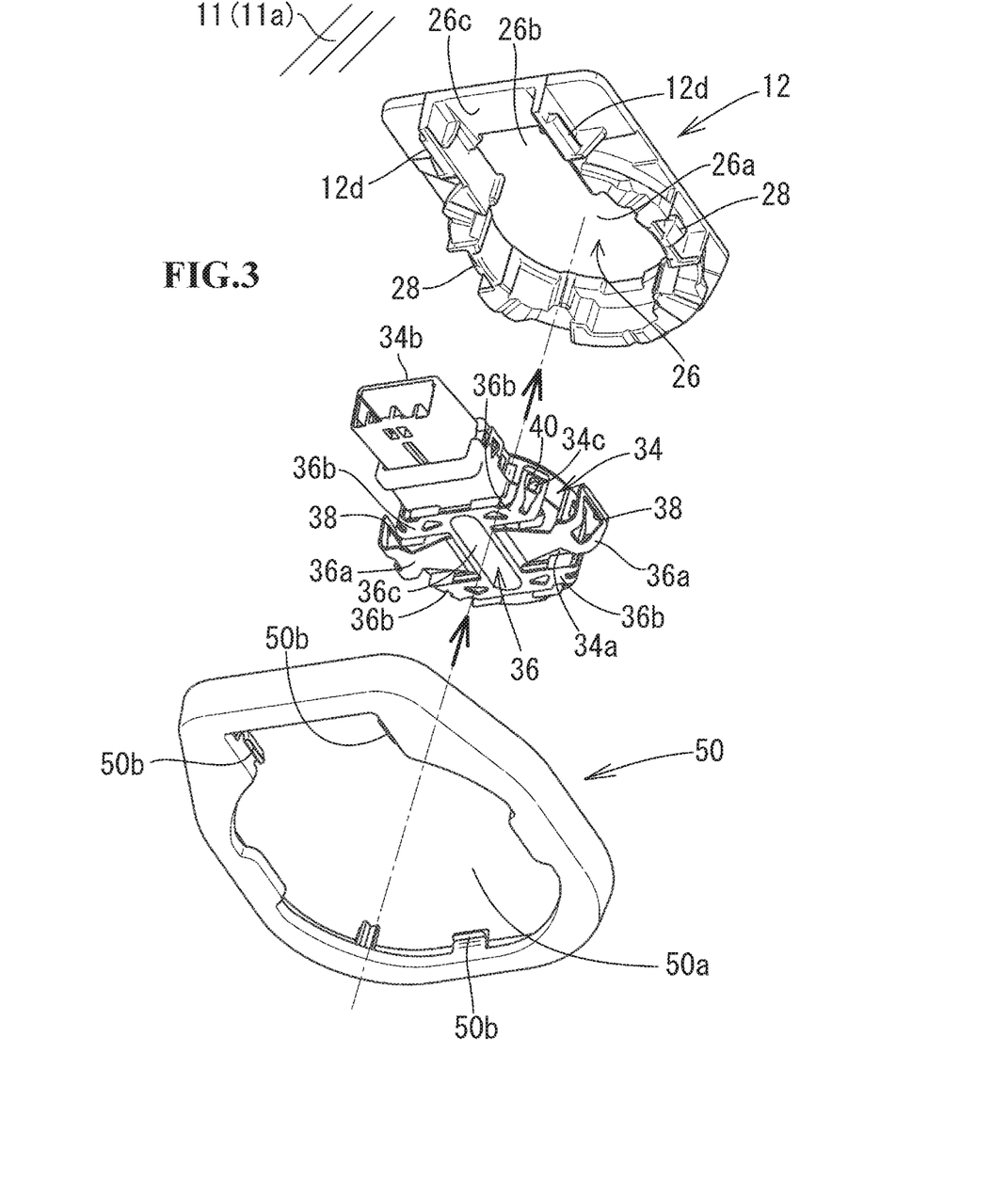
FIG. 3 is a perspective diagram illustrating a manner of mounting the sensor and the cover to the mounting base, with regard to the inner mirror in FIG. 1.

FIG. 3 illustrates a step of mounting the sensor 34 and the cover 50 to the mounting base 12. The mounting base 12 is bonded to the windshield surface 11a in advance. Also, the sensor 34 and the sensor assembling leaf spring 36 are assembled in advance. In this way, assembling the sensor 34 and the sensor assembling leaf spring 36 in advance enables the subsequent steps to be performed easily. The sensor 34 is inserted and received in the sensor assembling void 26. The sensor assembling leaf spring 36 is mounted to the mounting base 12 by bringing the mounting base-side leaf spring mounting portions 28 (engagement pawls) of the mounting base 12 into pawl engagement with the left and right mounting base mounted portions 38 (pawl engagement holes) of the sensor assembling leaf spring 36. Consequently, the sensor 34 is mounted to the mounting base 12. As a result, the front surface, that is, the sensing surface 34f of the sensor 34, is pressed against the windshield surface 11a by the biasing force of the sensor assembling leaf spring 36. In this way, before mounting of the support stay 14 to the mounting base 12, the sensor 34 is stably held on the mounting base 12 in a state in which the sensor 34 is pressed against the windshield surface 11a. Subsequently, the connector of the vehicle-side sensor harness is connected to the connector 34b of the sensor 34, and furthermore, the cover 50 is mounted to the mounting base 12 via pawl engagement. The state after mounting of the cover 50 is illustrated on the upper side of FIG. 6.

<<Step of mounting the support stay mounting leaf spring to the support stay>>

Figure 4:
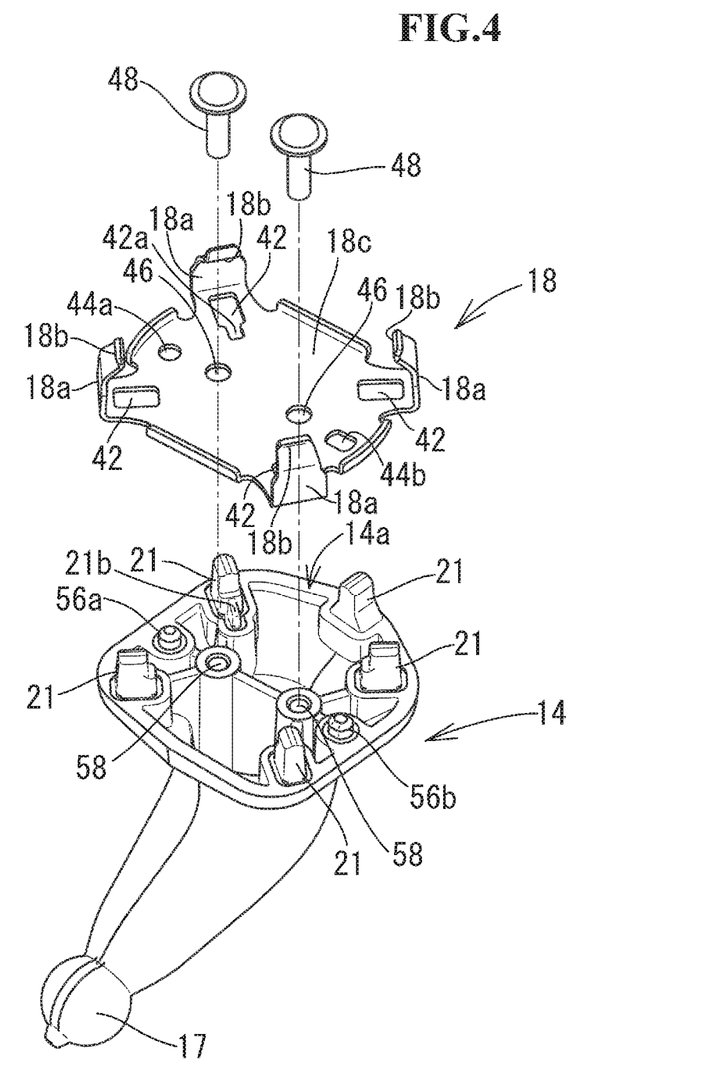
FIG. 4 is a perspective diagram illustrating a manner of mounting a support stay mounting leaf spring to a support stay, with regard to the inner mirror in FIG. 1.
Figure 5A:
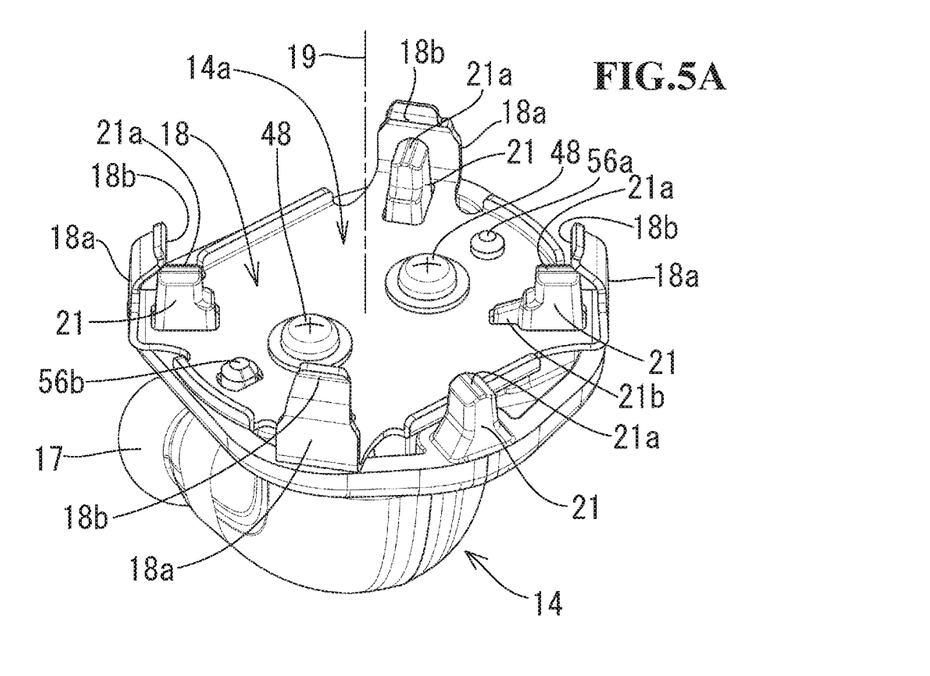
FIG. 5A is a diagram illustrating a state in which the leaf spring for support stay mounting is mounted to the support stay, with regard to the inner mirror in FIG. 1 and illustrates a state as a mounted surface is viewed obliquely from above.
Figure 5B:
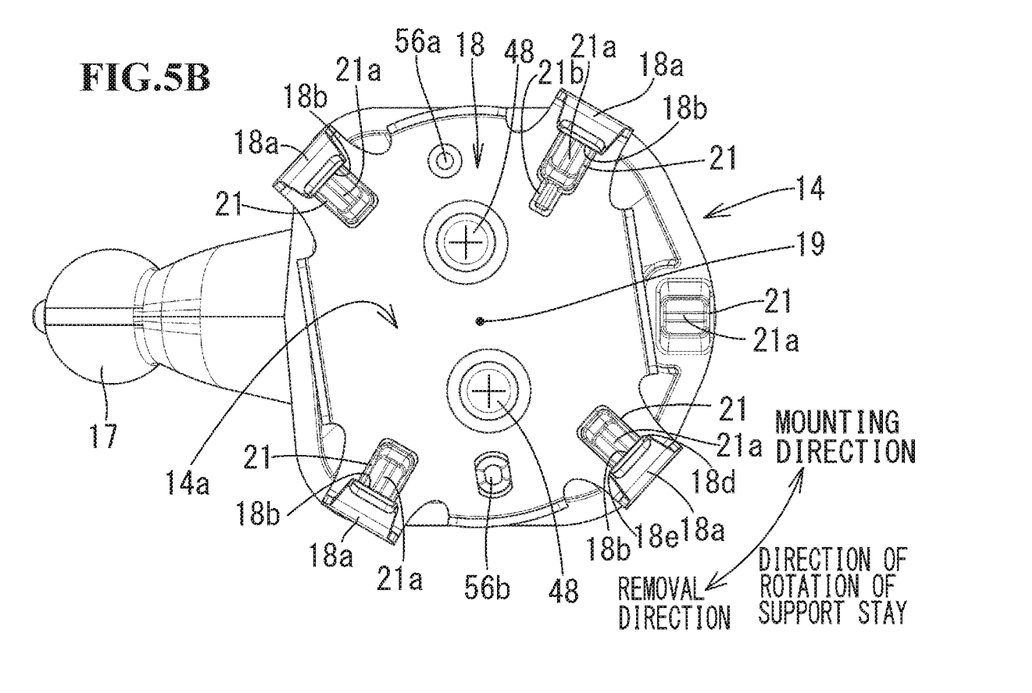
FIG. 5B is a diagram illustrating a state in which the support stay mounting leaf spring is mounted to the support stay, with regard to the inner mirror in FIG. 1 and illustrates a state as the mounted surface is viewed from the front.

FIG. 4 illustrates a step of mounting the support stay mounting leaf spring 18 to the support stay 14. The five protrusions 21, two positioning pins 56a, 56b and two screw holes 58 are formed in the mounted surface 14a of the support stay. The positioning pin 56a is a reference pin and the positioning pin 56b is a width-across-flats pin. The support stay mounting leaf spring 18 is placed on the mounted surface 14a of the support stay 14 by making the support stay mounting leaf spring 18 face the mounted surface 14a, inserting the protrusions 21 to the protrusion insertion holes 42, inserting the reference pin 56a to the positioning hole 44a and inserting the width-across-flats pin 56b to the positioning hole 44b. Subsequently, two tapping screws 48 are inserted to the two screw through holes 46 and screwed into the screw holes 58. Consequently, the support stay mounting leaf spring 18 is mounted to the mounted surface 14a of the support stay 14 with the support stay mounting portion 18c of the support stay mounting leaf spring 18 placed and supported on the mounted surface 14a of the support stay 14. FIGS. 5A and 5B each illustrate a state in which mounting of the support stay mounting leaf spring 18 on the mounted surface 14a is completed. The four legs 18a are disposed so as to surround the rotation axis 19, at respective positions that are the same in the radial direction with reference to the rotation axis 19. The four protrusions 21 are disposed so as to surround the rotation axis 19, at respective positions that are the same as those of the four legs 18a in the circumferential direction and are mutually the same in the radial direction on the inner circumferential side relative to the legs 18a, with reference to the rotation axis 19. The tops of the protrusions 21 each form a mound-like fitting lug 21a.

<<Step of Mounting the Support Stay on the Mounting Base>>

Figure 6:
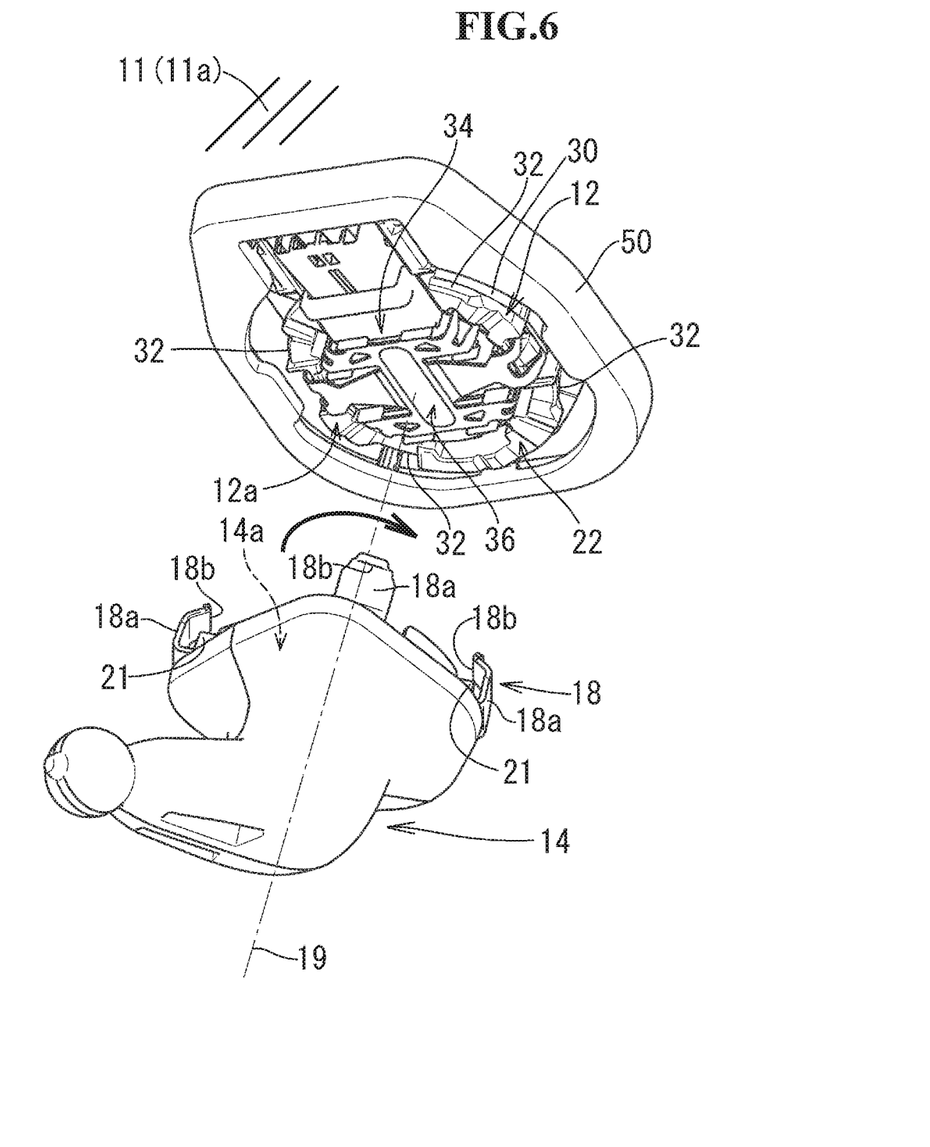
FIG. 6 is a perspective diagram illustrating a manner of mounting the support stay to the mounting base with the sensor and the cover mounted thereto, with regard to the inner mirror in FIG. 1.

After completion of assembling of the mounting base 12-side components and the support stay 14-side components through the above steps, the support stay 14 is mounted to the mounting base 12. FIG. 6 illustrates a step of mounting the support stay 14 to the mounting base 12. A worker holds the support stay 14 and makes the mounted surface 14a of the support stay 14 face the support stay mounting surface 12a of the mounting base 12. The worker moves the support stay 14 in a direction toward the mounting base 12 along the rotation axis 19, make the pawls 18b of the four legs 18a enter the entrances 32 and presses the pawls 18b into the entrances 32 to engage the pawls 18b with the circumferential groove 30. Consequently, the support stay 14 is loosely joined to the mounting base 12 to the extent that the support stay 14 does not drop off under its own weight. Upon the worker rotating the support stay 14 in the clockwise direction with his/her hand from this state, the pawls 18b slide on the circumferential grooves 30 and move along the circumferential grooves 30. Consequently, the pawls 18b reach respective positions off from the entrances 32 and the support stay 14 does not come off from the mounting base 12 with a small force. However, there is still backlash between the mounting base 12 and the support stay 14. Upon the worker further rotating the support stay 14 in the clockwise direction, a distance between the support stay mounting surface 12a and the mounted surface 14a is widened by the abutment support structures 20 against the biasing force of the legs 18a. Here, the abutment support structures 20 are formed of the undulating support surface 22 of the support stay mounting surface 12a and the protrusions 21 forming a supported surface of the mounted surface 14a. Accordingly, the biasing force of the legs 18a increases and the support surface 22 and the protrusions 21 strongly press and abut against each other. In this state, rotation of the support stay 14 is stopped and the support stay 14 is mounted to the mounting base 12. At this time, since the total four pawls 18b are disposed at respective circumferential positions that are the same as those of the parts of abutment between the support surface 22 and the protrusions 21 and are just on the outer circumferential side relative to the abutment parts, with reference to the rotation axis 19, it is possible to transmit the biasing force of the legs 18a to the abutment parts with good efficiency and stably maintain the mounted state. In the state in which the support stay 14 is mounted to the mounting base 12, the support stay 14 are not in contact with the sensor 34 and the sensor assembling leaf spring 36. Therefore, in mounting the support stay 14 to the mounting base 12, displacement of the sensor 34 from a correct position is curbed, enabling provision of good precision of assembling of the sensor 34. Consequently, mounting of the support stay 14 to the windshield surface 11a is completed.

<<Step of Mounting the Mirror Body on the Support Stay>>

Before or after mounting of the support stay 14 to the mounting base 12, mounting of the mirror body 16 (FIG. 1) to the support stay 14 is performed. In performing mounting of the mirror body 16 to the support stay 14, the support stay 14 is inserted through the opening 52a of the auxiliary cover 52 (FIG. 2) in advance. Mounting of the mirror body 16 to the support stay 14 is performed by mounting the mirror body 16 to the pivot 17 of the support stay 14. The auxiliary cover 52 is mounted to the cover 50 by being fitted in the cover 50 in a state in which the support stay 14 is mounted to the mounting base 12. All of the steps end with the mounting of the auxiliary cover 52.

Figure 7A:
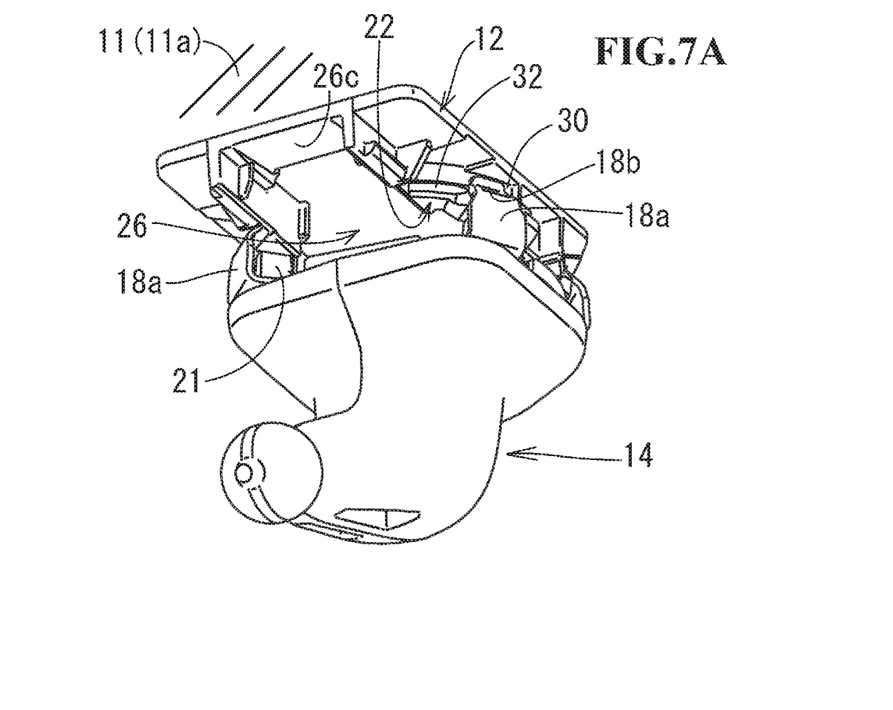
FIG. 7A is a perspective diagram illustrating a state in which mounting of the support stay to the mounting base is completed, with regard to the inner mirror in FIG. 1. The illustration is provided with the sensor, the cover, the auxiliary cover and the mirror body removed.
Figure 7B:
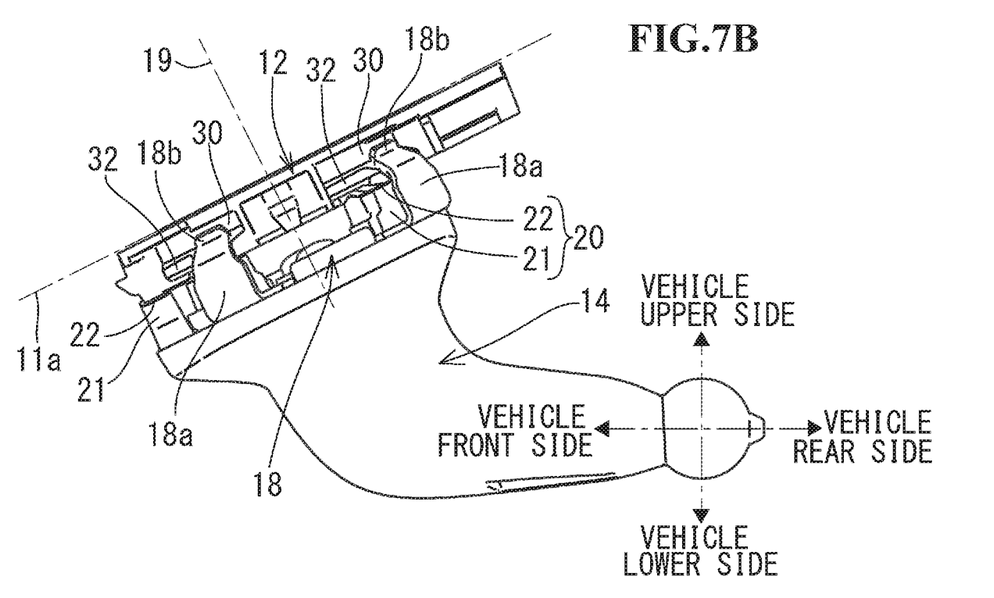
FIG. 7B is a side view of the state illustrated in FIG. 7A.
Figure 8A:
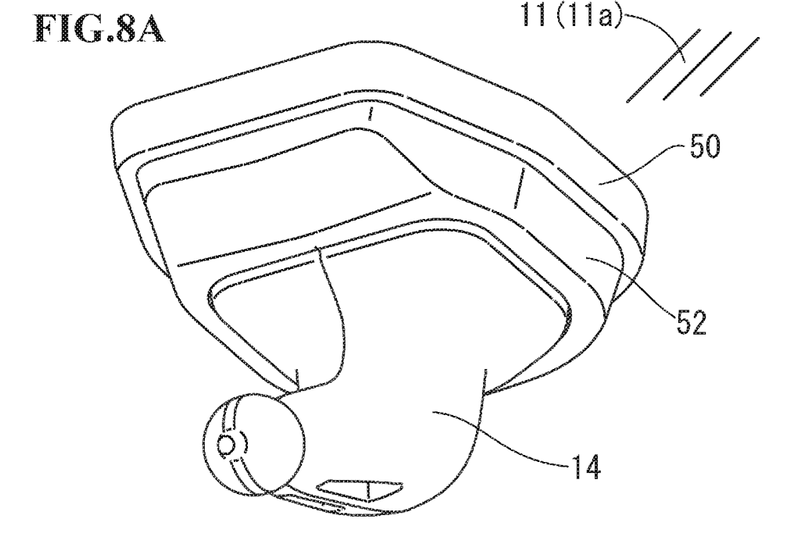
FIG. 8A is a perspective diagram illustrating a state in which mounting of the support stay to the mounting base is completed with regard to the inner mirror in FIG. 1. The illustration is provided with the cover and the auxiliary cover mounted.
Figure 8B:
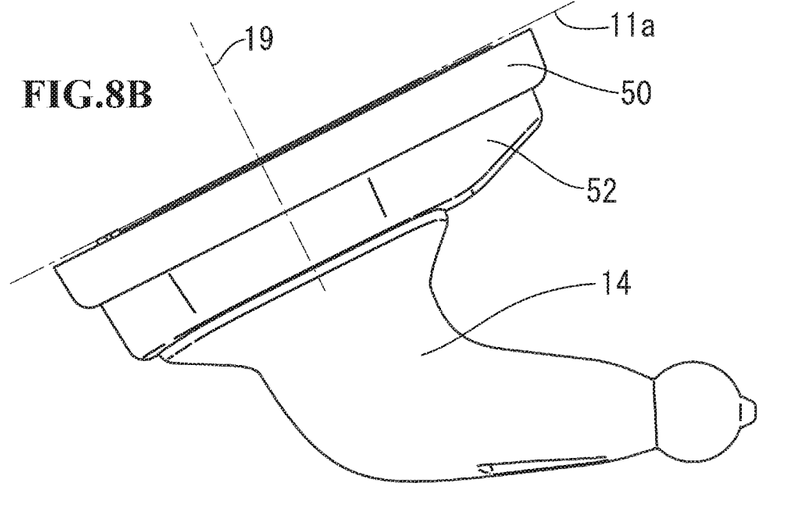
FIG. 8B is a side view of the state illustrated in FIG. 8A.
Figure 9A:
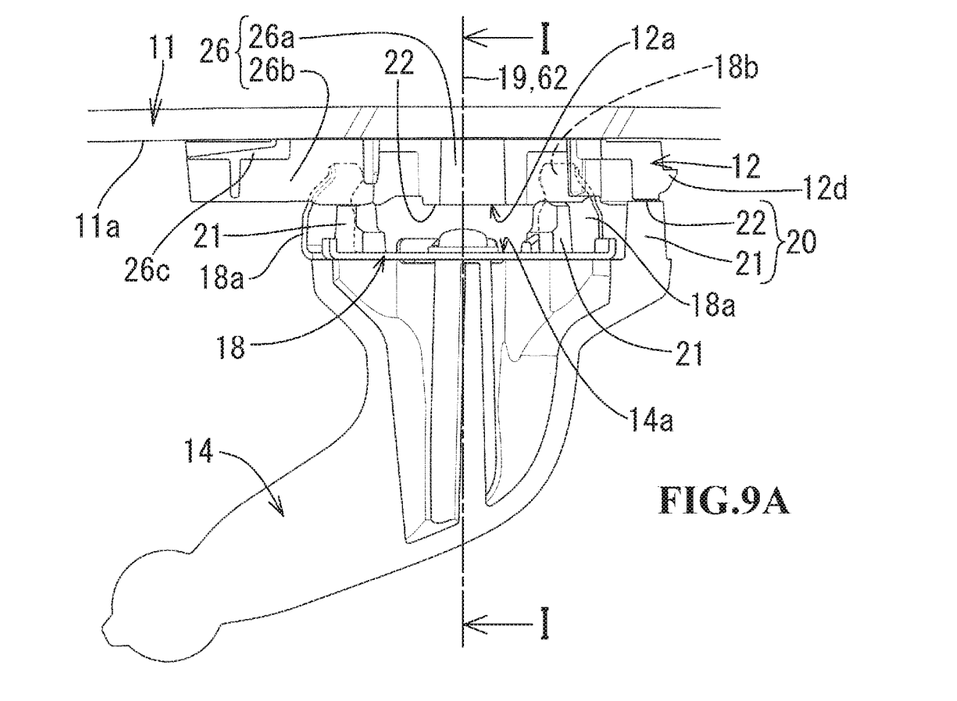
FIG. 9A is a diagram illustrating a state in which mounting of the support stay to the mounting base is completed, with regard to the inner mirror in FIG. 1. This figure is a sectional view at the position indicated by arrows II-II in FIG. 9B (that is, a sectional view along a vertical plane extending through a rotation axis in a vehicle front-rear direction). The illustration is provided with the sensor, the cover, the auxiliary cover and the mirror body removed.
Figure 9B:
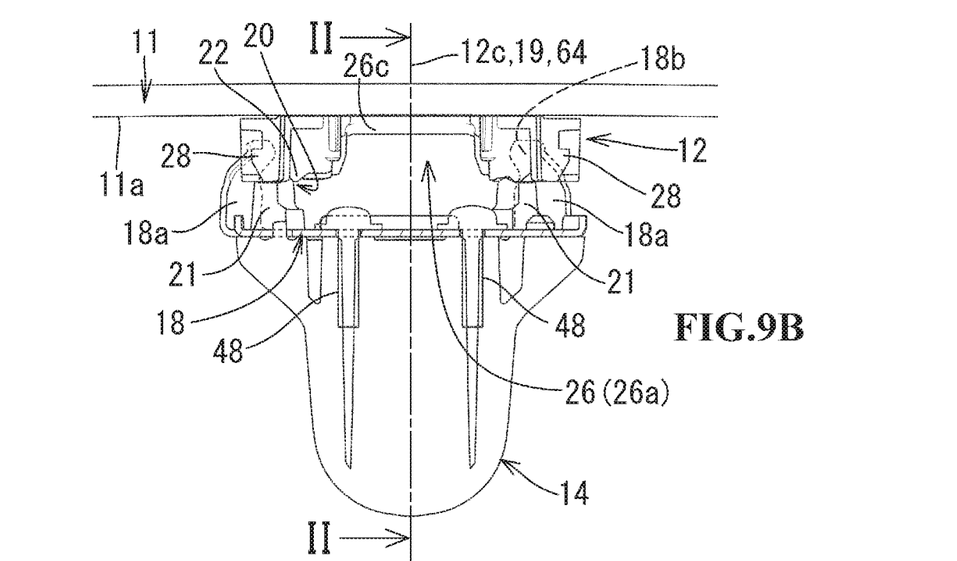
FIG. 9B is a sectional view at the position indicated by arrows I-I in FIG. 9A (that is, a sectional view along a non-vertical plane extending through the rotation axis in a vehicle left-right direction).
Figure 10A:
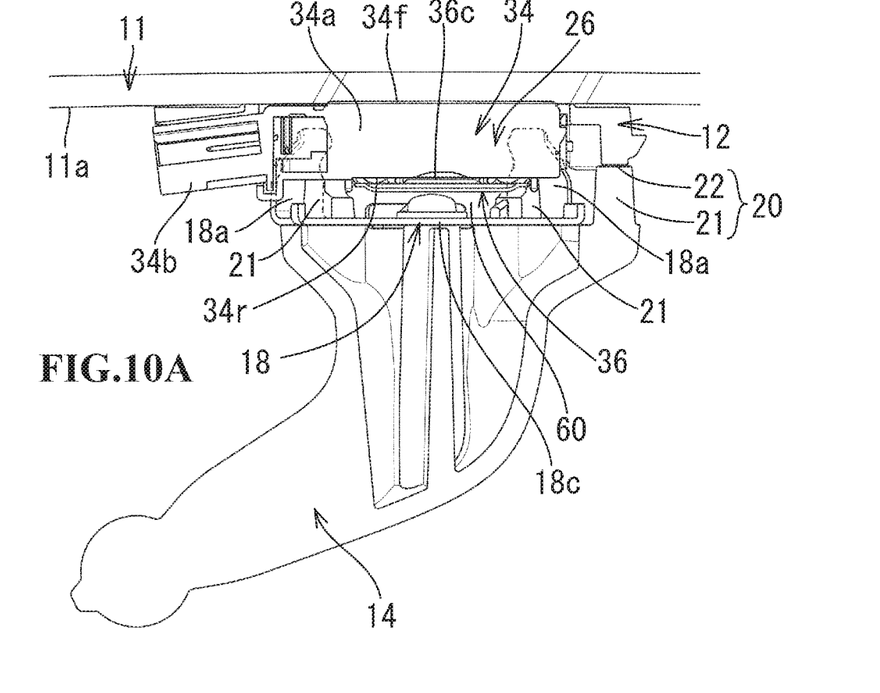
FIG. 10A is a sectional view at a position that is the same as that of FIG. 9A and illustrates a state in which the sensor is mounted.
Figure 10B:
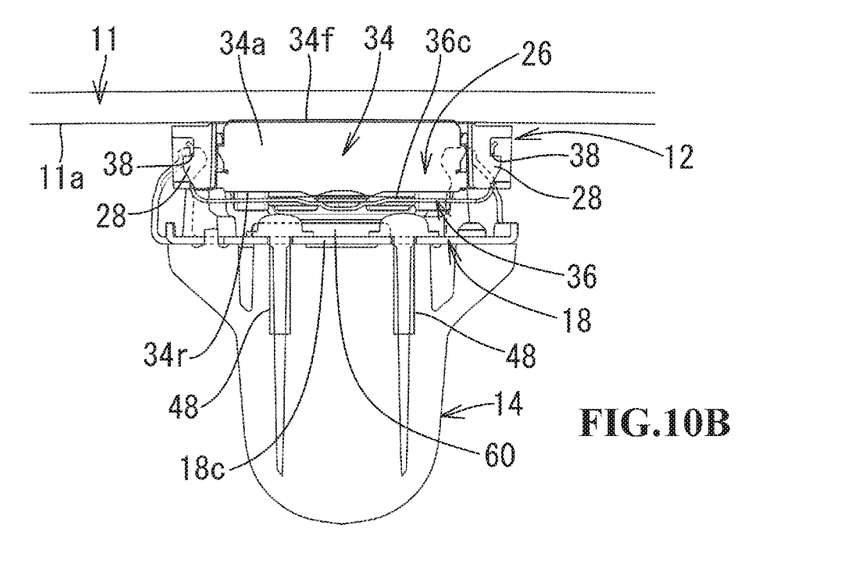
FIG. 10B is a sectional view at a position that is the same as that of FIG. 9B and illustrates a state in which the sensor is mounted.

A structure of the mounting part in a state in which the mounting of the support stay 14 to the windshield surface 11a is completed will be described with reference to FIGS. 7 to 10. Note that illustration of the mirror body 16 is omitted in FIGS. 7 to 10. FIGS. 7A and 7B each illustrate a state in which mounting of the support stay 14 to the windshield surface 11a is completed, with the sensor 34, the cover 50 and the auxiliary cover 52 removed. FIGS. 8A and 8B each illustrate that state, with the cover 50 and the auxiliary cover 52 mounted. FIG. 9A illustrates a section of that state at the position indicated by arrows II-II in FIG. 9B, that is, a section of that state cut along a vertical plane 64 extending through the rotation axis 19 in the vehicle front-rear direction (that is, a plane orthogonal to the sheet of FIG. 9B). FIG. 9B illustrates a section of that state at the position indicated by arrows I-I in FIG. 9A, that is, a section of that state cut along a non-vertical plane 62 extending through the rotation axis 19 in a vehicle left-right direction (that is, a plane orthogonal to the sheet of FIG. 9A). FIGS. 9A and 9B each illustrate the state with the sensor 34, the cover 50 and the auxiliary cover 52 removed. FIG. 10A illustrates a section at a position that is the same as that of FIG. 9A, with the sensor 34 mounted (with the cover 50 and the auxiliary cover 52 removed). FIG. 10B illustrates a section at a position that is the same as that of FIG. 9B, with the sensor 34 mounted (with the cover 50 and the auxiliary cover 52 removed). As illustrated in FIGS. 7A and 7B, the pawls 18b of the four legs 18a are made to enter from the entrances 32 and rotated in the direction around the rotation axis 19 and thereby engage with the circumferential grooves 30. Also, the support surface 22 and the protrusions 21 forming the supported surface are strongly pressed and abut against each other at five places in the direction around the rotation axis 19, by the biasing force of the legs 18a. Consequently, the support stay 14 is stably mounted to the windshield surface 11a. Also, as illustrated in FIGS. 8A and 8B, in a state in which the cover 50 and the auxiliary cover 52 are mounted, the mounting base 12 and the parts of joining between the mounting base 12 and the support stay 14 are hidden from the outside. Also, as illustrated in FIGS. 10A and 10B, a front surface (sensing surface) 34f of the sensor 34 is pressed against the windshield surface 11a by the sensor assembling leaf spring 36. Also, a gap 60 is formed between the support stay mounting surface 12a and the mounted surface 14a (more precisely, between the sensor pressing portion 36c of the sensor assembling leaf spring 36 and the support stay mounting portion 18c of the support stay mounting leaf spring 18). Various harnesses such as a sensor harness and a harness for a camera monitoring system (CMS), harness connectors, etc., can be disposed by effectively using the gap 60. Therefore, space for places for dispositions of these harnesses and harness connectors can be saved, enabling reduction of an area in the windshield 11, the area blocking a forward view, and as a result, enabling widening the forward view and thus contribution to safe driving. Also, since the support stay 14 are not in contact with the sensor 34 and the sensor assembling leaf spring 36, vibration of the support stay 14 due to the vehicle running is less easily transmitted to the sensor 34, enabling a failure of the sensor 34 to be less likely to occur.

Although in the above embodiment, the crests and the troughs of the abutment support structures are disposed on the mounting base side, and the protrusions are disposed on the support stay side, the disposition can be reversed. In other words, the protrusions of the abutment support structures can be disposed on the mounting base side and the crests and the troughs can be disposed on the support stay side. Although in the above embodiment, the support stay mounting leaf spring is mounted to the support stay by means of screw fastening, the method for mounting the support stay mounting leaf spring to the support stay is not limited to this example. For example, a support stay mounting leaf spring can be mounted to a support stay by means of insert molding by disposing the support stay mounting leaf spring in a mold for resin-molding of the support stay. Although the inner mirror of the above embodiment includes a support stay and a mirror body that are separated from each other, this invention is applicable also to an inner mirror including a support stay and a mirror body that are not separated from each other (that is, a structure in which a support stay and a mirror body are integrated).

The invention claimed is:

1. An assembling structure for an inner mirror for a vehicle, the assembling structure assembling a sensor to an inner mirror for a vehicle, wherein:
the inner mirror includes a mounting base to be mounted to a windshield surface of a cabin of a vehicle, a support stay to be mounted to the mounting base so as to be capable of dropping off from the mounting base, and a mirror body supported by the support stay;
the inner mirror includes a structure in which a support stay mounting surface of the mounting base and a mounted surface of the support stay are made to face each other and the mounting base and the support stay are joined via a support stay mounting leaf spring so as to be capable of rotating relative to each other in a direction around a predetermined rotation axis crossing the surfaces facing each other;

the support stay mounting surface and the mounted surface include respective abutment support structures that are formed in the direction around the rotation axis and abut against each other via a biasing force of the support stay mounting leaf spring;

the inner mirror is configured in such a manner that when the support stay is rotated in the direction around the rotation axis against the biasing force of the support stay mounting leaf spring in a state in which the mounting base and the support stay are joined via the support stay mounting leaf spring, the support stay is mounted to the mounting base by increasing the biasing force of the support stay mounting leaf spring via the abutment support structures to bring the support stay mounting surface and the mounted surface into pressure-abutment with each other;

the inner mirror is configured in such a manner that when an external force of a predetermined amount or more is applied to the support stay in a state in which the support stay is mounted to the mounting base, joining between the support stay and the mounting base is undone against the biasing force of the support stay mounting leaf spring by the external force to make the support stay drop off from the mounting base;

the assembling structure includes a sensor assembling void formed in the mounting base, a sensor assembling leaf spring, and a mounting base-side leaf spring mounting portion formed at the mounting base;

the sensor assembling void is configured to receive the sensor;

the sensor assembling leaf spring includes a mounting base mounted portion; and the assembling structure is configured in such a manner that in a state in which the sensor is received in the sensor assembling void, the sensor assembling leaf spring is mounted to the mounting base-side leaf spring mounting portion via the mounting base mounted portion, thereby maintaining the sensor received in the sensor assembling void via the sensor assembling leaf spring.

2. The sensor assembling structure for an inner mirror for a vehicle according to claim 1, wherein:

the sensor assembling leaf spring includes a sensor pressing portion; and the assembling structure is configured in such a manner that in a state in which the mounting base is mounted to the windshield surface of a cabin of a vehicle, the sensor is received in the sensor assembling void and the sensor assembling leaf spring is mounted to the mounting base-side leaf spring mounting portion via the mounting base mounted portion, the sensor pressing portion presses the sensor to press the sensor against the windshield surface.

3. The sensor assembling structure for an inner mirror for a vehicle according to claim 2, wherein in a state in which the support stay is mounted to the mounting base, the sensor is not in contact with the support stay.

4. The sensor assembling structure for an inner mirror for a vehicle according to claim 1, wherein in a state in which the support stay is mounted to the mounting base, the sensor is not in contact with the support stay.

5. The sensor assembling structure for an inner mirror for a vehicle according to claim 1, wherein:

the assembling structure includes a sensor-side leaf spring mounting portion formed at the sensor;

the sensor assembling leaf spring includes a sensor mounted portion; and the sensor assembling leaf spring is mounted to the sensor-side leaf spring mounting portion via the sensor mounted portion.

6. The sensor assembling structure for an inner mirror for a vehicle according to claim 5, wherein the mounting base-side leaf spring mounting portion of the mounting base and the mounting base mounted portion of the sensor assembling leaf spring are mounted to each other via pawl engagement, and the sensor-side leaf spring mounting portion of the sensor and the sensor mounted portion of the sensor assembling leaf spring are mounted to each other via the pawl engagement.

7. The sensor assembling structure for an inner mirror for vehicle according to claim 1, wherein a gap is formed in part or entirety of an area between the support stay mounting surface and the mounted surface, except places at which the support stay mounting surface and the mounted surface abut against each other via the abutment support structures, in a state in which the support stay is mounted to the mounting base.

* * * * *

UNITED STATES PATENT AND TRADEMARK OFFICE
CERTIFICATE OF CORRECTION

PATENT NO. : 11,254,264 B2
APPLICATION NO. : 16/965166
DATED : February 22, 2022
INVENTOR(S) : N. Sugimura et al.

Page 1 of 1

It is certified that error appears in the above-identified patent and that said Letters Patent is hereby corrected as shown below:

In the Claims

Column 14, Lines 37-38 (Claim 7, Lines 1-2) please change "for vehicle" to -- for a vehicle --

Signed and Sealed this
Thirteenth Day of September, 2022

Katherine Kelly Vidal
*Director of the United States Patent and Trademark Office*